(12) United States Patent
Math et al.

(10) Patent No.: US 7,590,784 B2
(45) Date of Patent: Sep. 15, 2009

(54) DETECTING AND RESOLVING LOCKS IN A MEMORY UNIT

(75) Inventors: Prakash Math, Hillsboro, OR (US);
Matthew Merten, Hillsboro, OR (US);
Sebastien Hily, Hillsboro, OR (US);
Beeman Strong, Portland, OR (US);
Morris Marden, Hillsboro, OR (US);
David Burns, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 11/513,636

(22) Filed: Aug. 31, 2006

(65) Prior Publication Data

US 2008/0059723 A1 Mar. 6, 2008

(51) Int. Cl.
*G06F 13/00* (2006.01)
(52) U.S. Cl. ..................... 710/112; 710/200
(58) Field of Classification Search .............. 710/112, 710/200, 240
See application file for complete search history.

(56) References Cited

U.S. PATENT DOCUMENTS

| | | | | |
|---|---|---|---|---|
| 5,293,621 A * | 3/1994 | White et al. | ............... | 710/107 |
| 5,644,733 A * | 7/1997 | Kalish et al. | ............... | 710/113 |
| 5,717,876 A * | 2/1998 | Robertson | ................... | 710/309 |
| 6,078,981 A * | 6/2000 | Hill et al. | ..................... | 710/200 |
| 6,128,677 A * | 10/2000 | Miller et al. | .................. | 710/40 |
| 6,141,715 A * | 10/2000 | Porterfield | .................. | 710/113 |
| 6,178,493 B1 * | 1/2001 | Lenk et al. | ..................... | 712/28 |
| 6,247,121 B1 | 6/2001 | Akkary et al. | ............... | 712/239 |
| 6,434,673 B1 * | 8/2002 | Palanca et al. | ............... | 711/133 |
| 6,920,516 B2 * | 7/2005 | Hartwell et al. | ............... | 710/263 |
| 7,000,047 B2 * | 2/2006 | Nguyen et al. | ............... | 710/200 |
| 7,082,500 B2 * | 7/2006 | Scott et al. | ................... | 711/141 |
| 7,320,100 B2 * | 1/2008 | Dixon et al. | ................. | 714/758 |
| 2006/0064695 A1 | 3/2006 | Burns et al. | ................. | 718/100 |
| 2006/0161738 A1 | 7/2006 | Saha et al. | .................... | 711/150 |

OTHER PUBLICATIONS

Eyerman et al. A Top-Down Approach to Architecting CPI Component Performance Counters. IEEE Computer Society. 2007.*
Ho et al. On deadlock, livelock, and forward progress. Technical Report. No. 633. May 2005.*
Mirza-Aghatabar et al. An Adaptive Software-based Deadlock Recovery Technique. 22nd International Conference on Advanced Information Networking and Applications. IEEE. 2008.*
U.S. Appl. No. 11/301,058, filed Dec. 12, 2005, entitled "Breaking A Lock Situation In A System," by Avi Mendelson, Michael Mishaeli and Julius Mandelblat.

* cited by examiner

*Primary Examiner*—Mark Rinehart
*Assistant Examiner*—Matthew D Spittle
(74) *Attorney, Agent, or Firm*—Trop, Pruner & Hu, P.C.

(57) ABSTRACT

In one embodiment, the present invention includes an apparatus having a first counter to count dispatches of a senior request in a memory unit, a second counter to count cycles of a processor coupled to the memory unit, and a controller coupled to the first and second counters to execute one or more one remediation measures with respect to the senior request based on a value of at least one of the counters. Other embodiments are described and claimed.

12 Claims, 4 Drawing Sheets

DETECTING AND RESOLVING LOCKS IN A MEMORY UNIT

BACKGROUND

Modern systems are complex systems that include multiple processing engines, such as multiprocessor systems, multicore processors, and the like. Furthermore, multiple threads or agents can be processed simultaneously in one or more processors of the system. Accordingly, the operation and synchronization of different portions of a system are becoming more involved.

One problem that may arise as a result of the increased complexity of computing systems is a lock situation. Such a situation can occur when multiple agents desire to use the same resource. Such agents may be different software threads, different system components or the like, and similarly, the resources competed for may be hardware resources of a processor, a memory execution unit of the processor or other system components, or data owned by a system agent.

When multiple agents of a system compete for ownership of a resource, performance can be negatively affected. In one scenario, at least one agent cannot make forward progress until it is able to obtain ownership of the resource. In an even more serious scenario, neither of an owning system agent and a requesting system agent can make forward progress as the requesting agent consumes the owning agent with requests for ownership or similar requests. Other examples of a lock situation are when two agents wait for each other to release an occupied resource.

A lock situation may be of different types, including a so-called "live" lock situation or a so-called "dead" lock situation. In a live lock situation, one or more agents is highly active in attempting to gain ownership of the desired resource. In such a situation, the owner agent may find it very difficult to make forward progress with its task as repeated requests for ownership are received from the requesting block, or each time the resource becomes free, a first requesting agent is denied and a second requesting agent obtains the resource. In a dead lock situation, one or more agents may simply be in a wait state, waiting for a desired resource. However, during this wait state, the agent does not perform any useful work.

During both design and validation stages, efforts are made to avoid such lock situations. However, in light of the complexity of modern systems, lock situations may continue to occur. Furthermore, efforts to resolve a lock situation can have undesired negative performance effects on a system.

DETAILED DESCRIPTION

In various embodiments, a lock breaking unit may be used to provide for forward progress on each of multiple threads in a memory subsystem (also referred to herein as a memory execution unit or MEU) such as a memory subsystem of a processor, e.g., a multi-threaded processor. While the scope of the present invention is not limited in this regard, in one embodiment an oldest request in the memory subsystem may be dynamically analyzed to determine if it is not able to make forward progress. If a lack of forward progress is detected on this request, one or more actions may be initiated to enable forward progress.

Note that a lack of forward progress can be due to a number of reasons such as live locks, dead locks, starvation, fairness issues and sometimes even register-transfer level (RTL) bugs, all of which may be generically referred to herein as lock situations. Forward progress mechanisms in accordance with various embodiments may be used to ensure a more reliable product and can even act as a backup mechanism for potential flaws that may be detected later on in silicon. In various embodiments, a lock breaker may include multiple detection mechanisms, each of which may implement multiple levels of attempts to make forward progress. If the last attempt fails, the lock breaker may indicate a failure or other status signal to transfer control to, e.g., a forward progress mechanism of a retirement unit or other portion of a processor.

Figure 1:
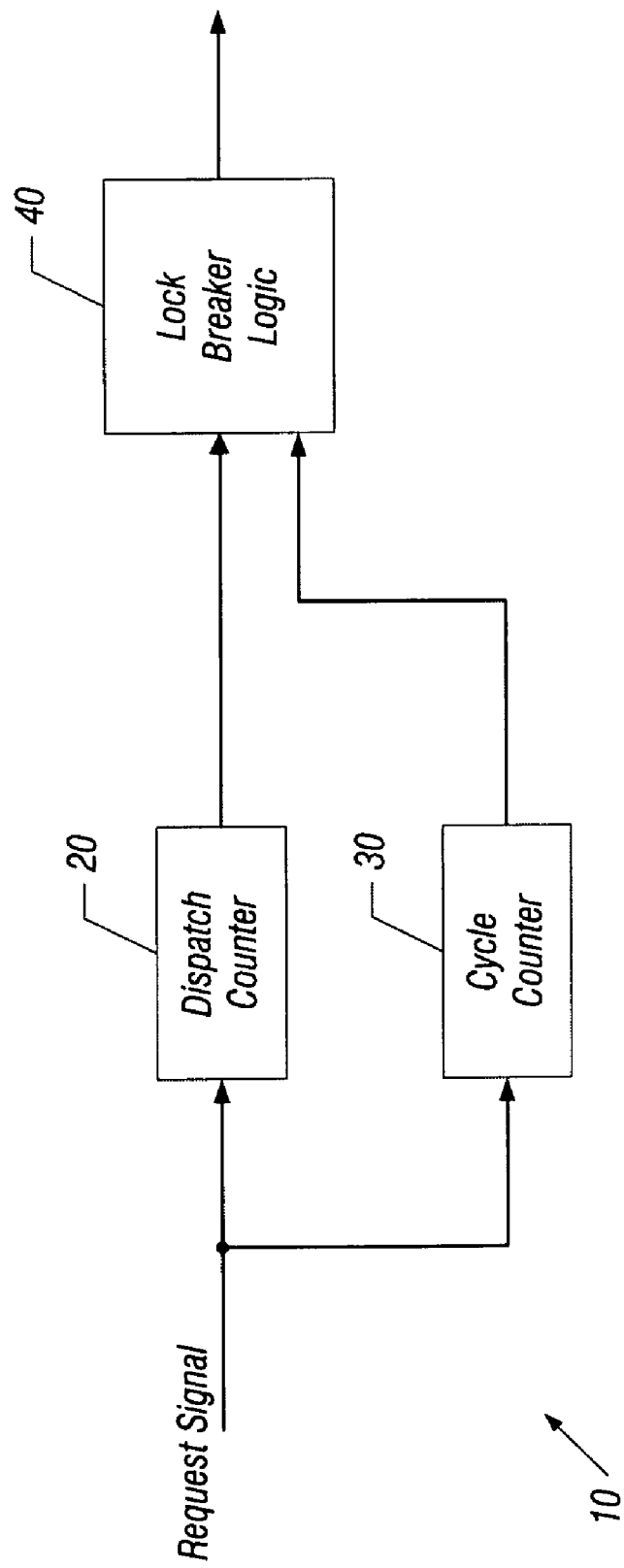
FIG. 1 is a block diagram of a lock unit in accordance with one embodiment of the present invention.

Referring now to FIG. 1, shown is a block diagram of a lock unit in accordance with one embodiment of the present invention. As shown in FIG. 1, lock unit 10 includes a dispatch counter 20, a cycle counter 30, and a lock breaker logic unit (referred to herein as lock breaker) 40. While shown with these limited components in the embodiment of FIG. 1, it is to be understood that the scope of the present invention is not limited in this regard and additional components may be present in other embodiments. Furthermore, it is to be understood that a lock breaker unit in accordance with an embodiment of the present invention may be implemented in hardware, firmware, software, or combinations thereof.

As shown in FIG. 1, dispatch counter 20 and cycle counter 30 are coupled to receive an incoming signal (i.e., a request signal). For example, this request signal may be received from a front end unit of a processor such as a reservation station (RS) or a memory order buffer (MOB) or another such structure of a memory execution unit. More particularly, the request signal may be received when a request becomes the oldest request in the MOB. As used herein, the terms "oldest request" and "senior request" may be used interchangeably, and both refer to a request for a memory operation (e.g., load or store) that is the oldest request in 'program order' that has not completed. When the request signal is received, dispatch counter 20 and cycle counter 30 may be initialized to begin count operations. Specifically, dispatch counter 20 may count a number of dispatches of this senior request. Dispatch counter 20 may be reset when this senior request completes. Similarly, cycle counter 30 may be initialized upon receipt of the request signal. Cycle counter 30 may be configured to count a number of cycles from its initiation until the senior request completes.

In one embodiment, dispatch counter 20 and cycle counter 30 may both be initialized at the same time. That is, they may start counting at the same time when a request becomes the oldest request in a processor or an oldest request in the MEU. If these counters reach one or more predetermined thresholds (which may be programmable), various actions can be taken to enable forward progress. The nature of the action taken may depend on the counter and the different threshold it has reached. Note that counters 20 and 30 may be reset or disabled under various conditions depending on the status of the request, providing for a dynamic framework to enable forward progress. A request could dispatch from the MOB multiple number times due to resource hazards before it eventually completes. Accordingly, dispatch counter 20 counts the number of dispatches from the MOB. Cycle counter 30 may be used to count the free running clocks in the MEU.

Note that each of counters 20 and 30 may be associated with multiple thresholds to enable lock breaking actions to be initiated when it is likely that the senior request is not making forward progress. As shown in FIG. 1, both dispatch counter 20 and cycle counter 30 may be coupled to lock breaker 40, which may receive an indication of the counts and, based on threshold levels (which may be programmable), may take various actions in an effort to enable completion of the senior request. Accordingly, lock breaker 40 may send control signals to various structures within an MEU to initiate certain lock breaking activities. Note that while shown as a separate unit in the embodiment of FIG. 1, in various implementations different portions of a lock unit may be located in different structures of an MEU.

In one embodiment, if a lock breaker detects that an oldest request is unable to make its way out of a front end structure of the MEU such as buffer, e.g., a MOB, one or more lightweight actions may be performed. For example, the lock breaker may try to clear a path for the oldest request to make its way out of the MOB by taking some lightweight actions which are specific to the interface of the MOB with other MEU agents. If the potential lock is still not resolved, lock unit 10 may, in a second attempt, detect if the request is unable to make its way out of other structures of a MEU such as a page miss handler (PMH) or cache pipelines (e.g., of level one (L1) or level 2 (L2) caches). Depending on the status of the request, the lock breaker can take appropriate actions to clear the path for the locked request. If multiple lock breaking actions have been performed without completion of the oldest request, the lock breaker may then assert a "give-up" signal or other failure indication and hand over control to another agent, such as a lock breaking mechanism associated with a processor.

Note that at the time of the first attempt, the potential lock could be because of conditions that are beyond the control of the MOB, in which case, the second attempt may be able to address the issue. Embodiments may thus implement a progressive multiple level approach to enable detection and resolution of temporary lock scenarios at earlier stages, before heavyweight actions are needed to remove a processor from a totally locked scenario.

As discussed, dispatch counter 20 counts the number of dispatches of the oldest request from the MOB and may be used to trigger actions when it reaches one or more predetermined values. In some embodiments, the threshold values may be different for different types of requests since different request types can have different scheduling mechanisms. In one embodiment, the threshold values may be programmable via control registers. If the oldest request dispatches at least a first threshold level of times (e.g., a small number of times) without completing, lock breaker 40 may be triggered to take some actions. In one embodiment, such actions (referred to herein as dispatch counter actions) may be carried out in two stages. In the first stage (i.e., when the first threshold level is reached), one or more lightweight actions may be invoked. These lightweight actions try to create opportunities for the potentially locked request to break out of any beat pattern with other requests by blocking other (i.e., the non-oldest request and those of other threads) for a given time period, e.g., at least one cycle, although the scope of the present invention is not limited in this regard. In other words, the MOB may stall other requests while it dispatches the oldest request. If these lightweight actions do not resolve the potential live lock and the number of dispatches reaches a second stage (i.e., when a second threshold level is reached), similar actions may be taken for a longer time period. This time period may be based, for example, on the number of MEU pipeline stages.

If for whatever reason the locked request is never dispatched, then cycle counter 30 will eventually fire. However, in some embodiments cycle counter 30 may be reset on every dispatch of the oldest request on which it is counting. Note, however, that in some embodiments, it may not be reset on dispatches of the oldest request after dispatch counter 20 reaches at least the first threshold level. Thus if the request dispatches repeatedly but does not complete successfully, cycle counter 30 will fire. If the actions triggered by dispatch counter 20 fail to resolve potential locks, either because the request is not dispatching, or dispatch counter 20 has reached a final threshold level, then cycle counter 30 eventually triggers. In various embodiments, when cycle counter 30 reaches a threshold level, dispatch counter 20 may be disabled so that two lock breaking mechanisms are not taking actions at the same time.

Cycle counter 30, when initiated, starts to count towards a first threshold level. This first threshold of cycle counter 30 may be set at an approximation of how long (e.g., in cycle counts) a single long memory operation should take to complete on a given platform, after which there is a genuine concern that the request could be live locked and more aggressive lock breaking actions may be justified. In one embodiment, cycle counter threshold values may be programmable via the control registers. As an example, such thresholds may be set based on various parameters, such as operational frequency, platform type, memory technology and so forth. When a threshold level is reached, the status (e.g., ownership) of the oldest request that reached the threshold level may be determined. Note that different MEU agents can take vastly different times to accomplish their assigned tasks. Further, in some cases, an original request may spawn more memory operations in order to complete. For example, if a request causes a page table walk to get its address translation, more memory operations are inserted by the PMH to perform the page walk, meaning that the original request is owned by the PMH and may take more time than anticipated. By analyzing the status, the lock breaker becomes aware and may allow more time for the request to complete, rather than presume that there is a live lock and take actions that may actually be harmful. Note further that in various embodiments, the lock breaker may guard newly spawned memory operations against potential live locks.

Depending on which agent owns a request at the time a cycle counter threshold is reached, it may be determined whether any actions should be taken to enable forward progress. If it is determined that the agent that owns the request has taken an inordinately large amount of time to accomplish the task, appropriate actions to enable forward progress in that MEU agent can be taken. As an example, such actions may be used to essentially stop all traffic not related to the oldest request to the offending agent, which will give an opportunity for the live locked request to eventually obtain the needed resources in order to make forward progress. This will happen because no new requests are present to contend for the resources. Still further, in some embodiments the lock breaker may also implement actions that free up resources not being used by the oldest request to break up potential dead locks. As a result, all pending requests (including the oldest request) may eventually drain from the corresponding agent and enable forward progress.

In various embodiments, other actions to attempt to resolve a lock situation may include suspending or flushing younger requests from resources that may potentially be required by the oldest requests blocking dispatch of younger requests so that they do not occupy resources that may potentially be used by the oldest request. Still further, prefetchers may be flushed/reset so that they do not generate new requests that may compete with the oldest request for resources. Additionally, status registers may be altered so that they are biased to favor the oldest request.

However, it is possible that all lock breaking actions performed in the MEU do not enable completion of the oldest request. In such instances, cycle counter 30 may continue to count towards a final threshold value. The final threshold value may be set to be a sufficiently high value, which may be platform dependent, to filter very large latencies of regular memory operations. On reaching this final threshold value, the lock breaker may transfer the forward progress responsibility to, e.g., a retirement unit of a processor, which may take more heavy handed system-level actions to enable forward progress. Note that while shown with this implementation in the embodiment of FIG. 1, the scope of the present invention is not so limited. For example, in other embodiments only a single counter may be present (i.e., both counters and their associated lock breaker actions may be independent of each other).

Figure 2:
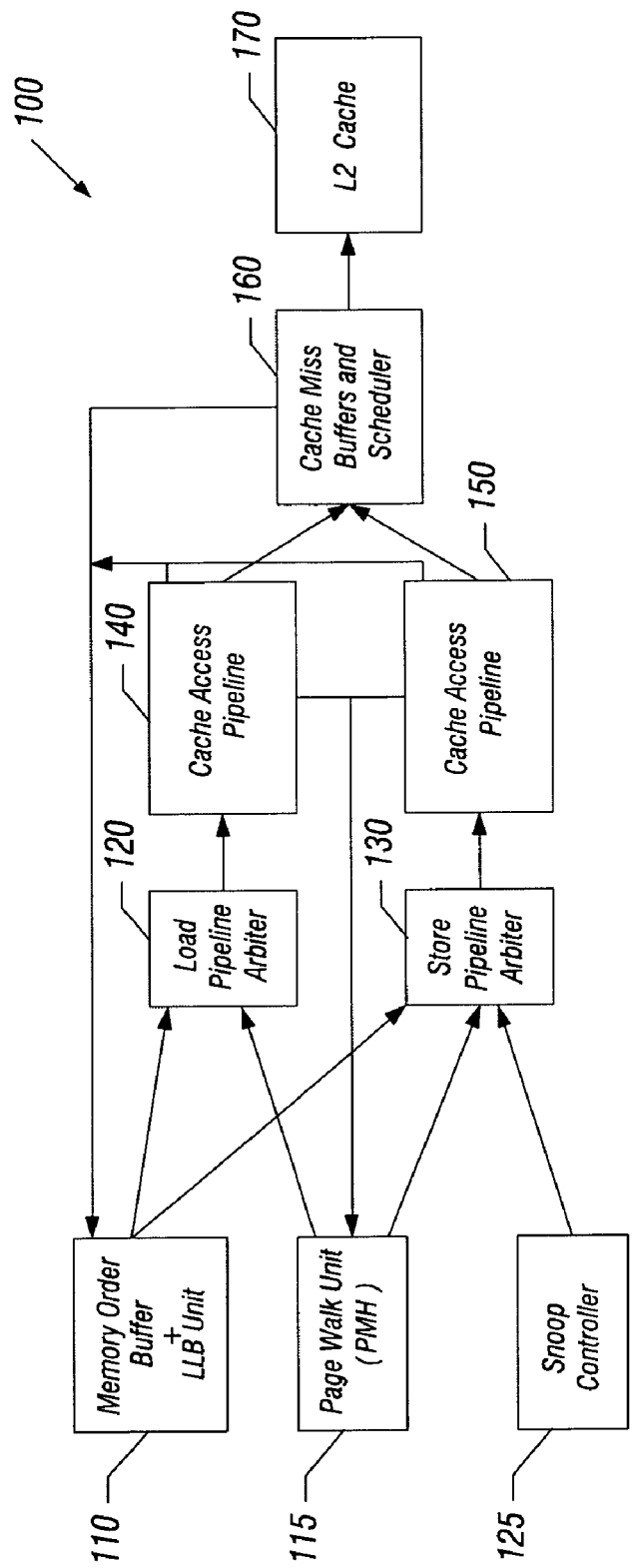
FIG. 2 is a block diagram of a memory execution unit in accordance with an embodiment of the present invention.

Referring now to FIG. 2, shown is a block diagram of a memory execution unit in accordance with an embodiment of the present invention. As shown in FIG. 2, a memory subsystem or MEU 100, which may be implemented on the same die as one or more cores of a processor such as a multi-core processor, is shown. In some implementations, a given processor may include multiple MEUs, each associated with a given processor core and/or execution thread, although the scope of the present invention is not limited in this regard.

As shown in FIG. 2, MEU 100 includes various agents that are responsible for accomplishing different tasks. MEU 100 may include a combined memory order buffer (MOB) and live lock breaker (LLB) unit (hereafter "MOB/LLB") 110. MOB/LLB 110 may include one or more buffer structures to store pending memory requests such as load and store requests received from a core or other portion of a processor. Each such entry in the buffer structure may include various information, including an identification of the address for the associated memory request, an indication of the memory operation to be performed, and a time indication, among other such information. In one embodiment, MOB/LLB 110 may act as a request scheduler to schedule incoming requests received in memory execution unit 100. In an out-of-order speculative processor, a given request can be "owned" by various agents in MEU 100. In other words, the unit that is responsible for ensuring the request depends on the stage of execution, and there may be limited or imprecise information available to MOB/LLB 110 on the status (e.g., ownership) of the request at any given point in time. Moreover, a given memory request can take vastly different amounts of time to complete depending on whether there was page walk effected or the request was satisfied in the caches of MEU 100 (or whether the request has to go outside of MEU 100 to fetch data). Thus this status information may be stored in MOB/LLB 110.

Further, MOB/LLB 110 may include various structures and logic to perform lock breaking in accordance with an embodiment of the present invention. For example, in one implementation, MOB/LLB 110 may include the components shown in FIG. 1. Note that in implementations where multiple MEUs may be present, a separate LLB unit may be associated with each such MEU. Alternately, in other embodiments, various LLB structures, such as counters and so forth, may be replicated in a single MEU according to the number of threads that can be handled within a single MEU.

Still referring to FIG. 2, MOB/LLB 110 may be coupled to a load pipeline arbiter 120 and a store pipeline arbiter 130. Each of these arbiters may be used to receive incoming memory requests and arbitrate between multiple incoming requests for a given type of memory operation (i.e., load or store). Accordingly, load pipeline arbiter 120 is coupled to a cache access pipeline 140, and store pipeline arbiter 130 is coupled to a cache access pipeline 150. These structures may include various logic to pipeline requests and satisfy them within cache structures (i.e., a level one (L1) cache). If such requests do not hit an entry within the cache structures, a miss occurs and accordingly cache access pipelines 140 and 150 may provide miss signals to a cache miss buffer and scheduler (scheduler) 160. Note that various feedback that indicates the status of requests (e.g., hit or miss) may be fed back from cache access pipelines 140 and 150 and scheduler 160 back to MOB/LLB 110. In this way, entries within the MOB may be deallocated when completed. Furthermore, the operation of various LLB logic described herein may be activated or stopped, based on the status of the oldest request.

Referring still to FIG. 2, if a miss occurs, scheduler 160 may schedule the missed request to a level 2 (L2) cache 170 to which it may be coupled. There, requests may be satisfied if present. Otherwise, a miss occurs and needed data may be obtained from higher levels of a memory hierarchy (e.g., off-chip caches, system memory or mass storage, for example).

Note further that various other structures within MEU 100 may be coupled to load pipeline arbiter 120 and store pipeline arbiter 130. For example, a page walk unit 115, which may include a page miss handler, may be coupled to both arbiters 120 and 130 to perform page walk activities if a requested address translation is missing. Similarly, a snoop controller 125 may be coupled to store pipeline arbiter 130 to enable operation of snoop activities with respect to requested store operations. While shown with this particular implementation in the embodiment of FIG. 2, it is to be understood that a memory execution unit may take other forms in different embodiments.

Figure 3:
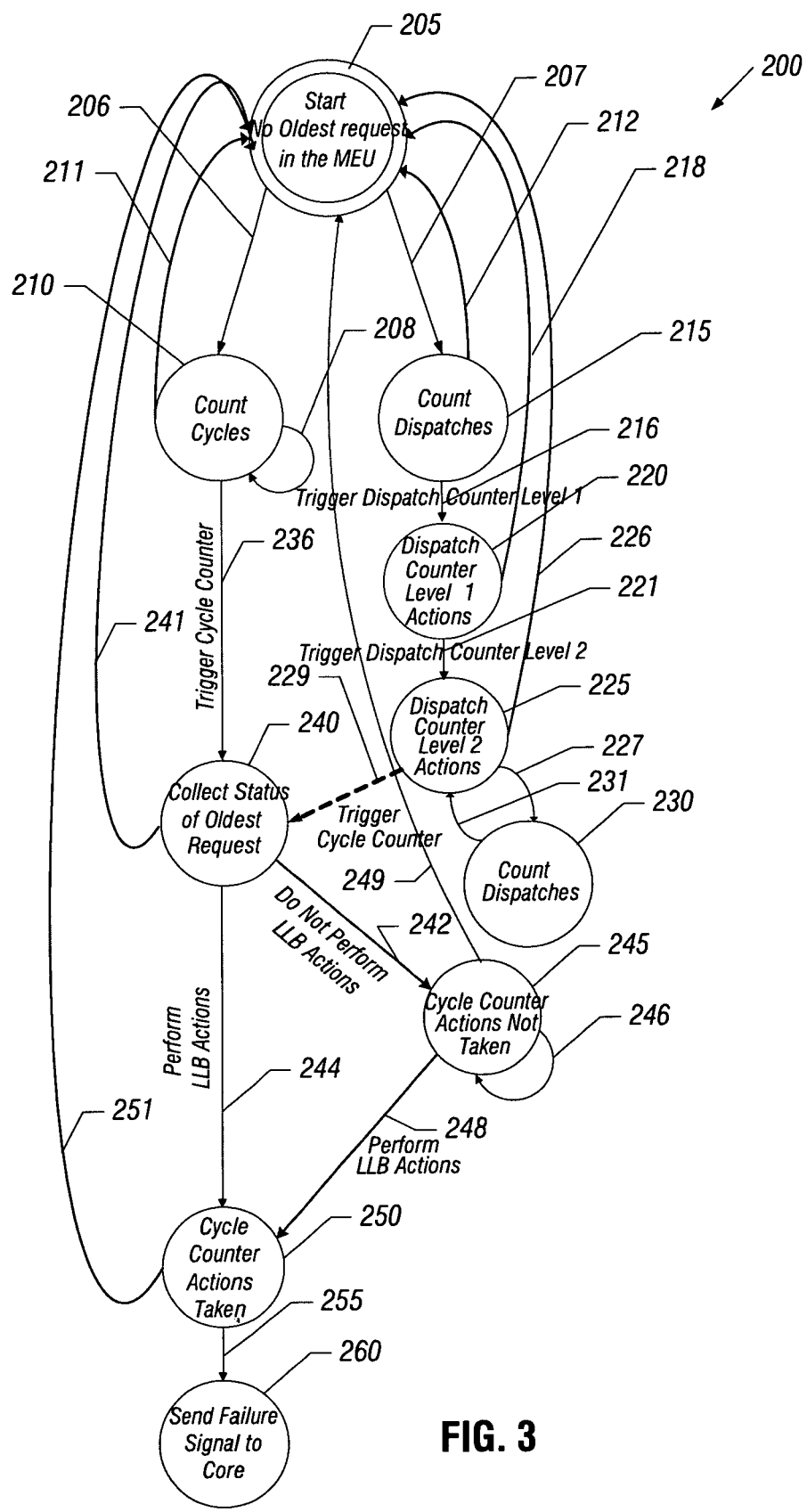
FIG. 3 is a state diagram of a method for performing lock breaking activities in accordance with an embodiment of the present invention.

Referring now to FIG. 3, shown is a state diagram of a method for performing lock breaking activities in accordance with an embodiment of the present invention. The method may be implemented by a lock breaker in accordance with an embodiment of the present invention, or other hardware, software, or firmware of a system (or combinations thereof). As shown in FIG. 3, method 200 may begin at a start state 205 in which no oldest request is present in the MEU. When an oldest request is received, states 210 and 215 are entered via lines 206 and 207, respectively simultaneously. In state 215, dispatches of the oldest request are counted, while in state 210 cycles from the initiation of the oldest request are counted. Accordingly, as shown in FIG. 3, line 208 resets the counter and loops back to state 210. This loop back line thus shows that the cycle counter is reset and starts to count again. This may happen when the dispatch counter increments to ensure that both dispatch counter and cycle counter do not fire at the same time. However, if and when the dispatch counter fires, the cycle counter may not be further reset to the initial value. The dispatch counter and actions associated with the dispatch counter may be disabled when the cycle counter fires, ensuring that lock breaking actions associated with the cycle counter and the dispatch counter are not active at the same time. If the oldest request completes prior to either of the counters reaching a respective predetermined first threshold, control passes back to state 205 via lines 211 and 212.

Note that the state diagram shown in FIG. 3 operates in a generally linear fashion from top to bottom. Thus, a first threshold for the dispatch counter is likely reached prior to the first threshold for the cycle counter. Accordingly, the state of the dispatch counter proceeds via line 216 to state 220, in which a first level of lock breaking actions are implemented. If such mechanism(s) result in completion of the oldest request, line 218 causes re-entry to the initial state 205. If instead the oldest request still does not complete, and a second predetermined threshold number of dispatches has occurred, control passes via signal 221 to a state 225 in which a second level of lock breaking mechanism(s) are performed. If such mechanism(s) result in completion of the oldest request, control returns to the start state 205 via line 226. Alternately, additional dispatches in state 230 are counted (as represented by the lines 227 and 231).

If the second level lock breaking actions do not result in completion of the request and/or if a first threshold amount of time (as measured in cycles) has occurred since initiation of cycle count state 210, the cycle counter may be triggered, and control passes via lines 236 or 229 to state 240 in which the cycle counter collects status information associated with the oldest request. Such status information may correspond to an identification of where the request is pending within the MEU, as well as additional information, such as associated memory operations (e.g., spawned requests) that remain pending, as well as a type of the oldest request and so forth. If while in state 240 the oldest request completes, control returns to start state 205 via line 241.

Otherwise, based on analysis of the status obtained, lock breaking actions, which may be more aggressive actions than those performed as a result of the dispatch counter, may be performed or not performed (via lines 242 and 244). Accordingly, a state 245 may be entered in which cycle counter-initiated lock breaking actions are not taken. Note that the cycle counter may be reset (as represented by line 246) if some form of forward progress is detected, and hence no lock resolving actions are initiated. The cycle counter may be reset and start counting all over (to detect potential lack of forward progress). If no forward progress is detected, the cycle may trigger via line 248, described below.

If the request completes, control returns to start state 205 via line 249. Note that in various implementations, there may be different instances when the lock breaker does not take any action even when the various counters are triggered. For example, if multithreading is enabled and the opposite thread is in the middle of an execution that cannot be interrupted, no action may be taken. As an example, when the opposite thread is in the middle of an atomic sequence such as checking for a software semaphore, lock breaking actions may be held until the opposite thread completes the atomic execution. The lock breaker may also block actions if the request has progressed beyond the scope of the memory subsystem and no actions in the MEU subsystem can help the request make forward progress. In such cases it is up to other forward progress mechanisms in other areas of a processor to ensure progress. Additional mechanisms may be used for other scenarios. For example, in a multi-threaded mode, a tie-breaker mechanism may be used if a lock breaker on both threads fires at the same time.

If instead the counter reaches a second threshold level without the oldest request completing (as represented by line 248) indicating a lack of forward progress, control passes to state 250 in which cycle counter-initiated lock breaking actions are taken. Similarly, state 250 is entered via line 244 if it is determined at the first threshold level of the cycle counter that lock breaking actions should be performed. Note that such lock breaking actions as a result of the cycle counter triggering may be more aggressive and may include clearing of various resources of the MEU, such as a MOB, arbiters, other buffer structures and the like. If such actions result in completion of the oldest request, control returns to start state 205 via line 251. Alternately, if a final threshold value is reached without completion of the oldest request, control passes to a failure state 260 via line 255.

At failure state 260, a failure signal or other such signal may be sent to one or more cores associated with the MEU to indicate the failure of the oldest request to make forward progress. Accordingly, the one or more cores may take more aggressive measures to resolve what is likely a live lock or other lack of forward progress. While shown with this particular implementation in the embodiment of FIG. 3, it is to be understood that the scope of the present invention is not limited in this regard and many other manners of performing multi-level lock breaking analyses and actions may be realized.

Thus in various embodiments, a lock breaker in accordance with an embodiment of the present invention may implement a series of schemes to detect early execution problems and take gradually more and more aggressive actions to resolve them. Embodiments may use a dynamic lock detection mechanism to avoid false firings and to focus the actions on the actual problem. That is, in various embodiments, a lock breaker may include multiple detectors and be multi-tiered. As such, actions can be taken based on how given requests such as micro-operations are locked.

Figure 4:
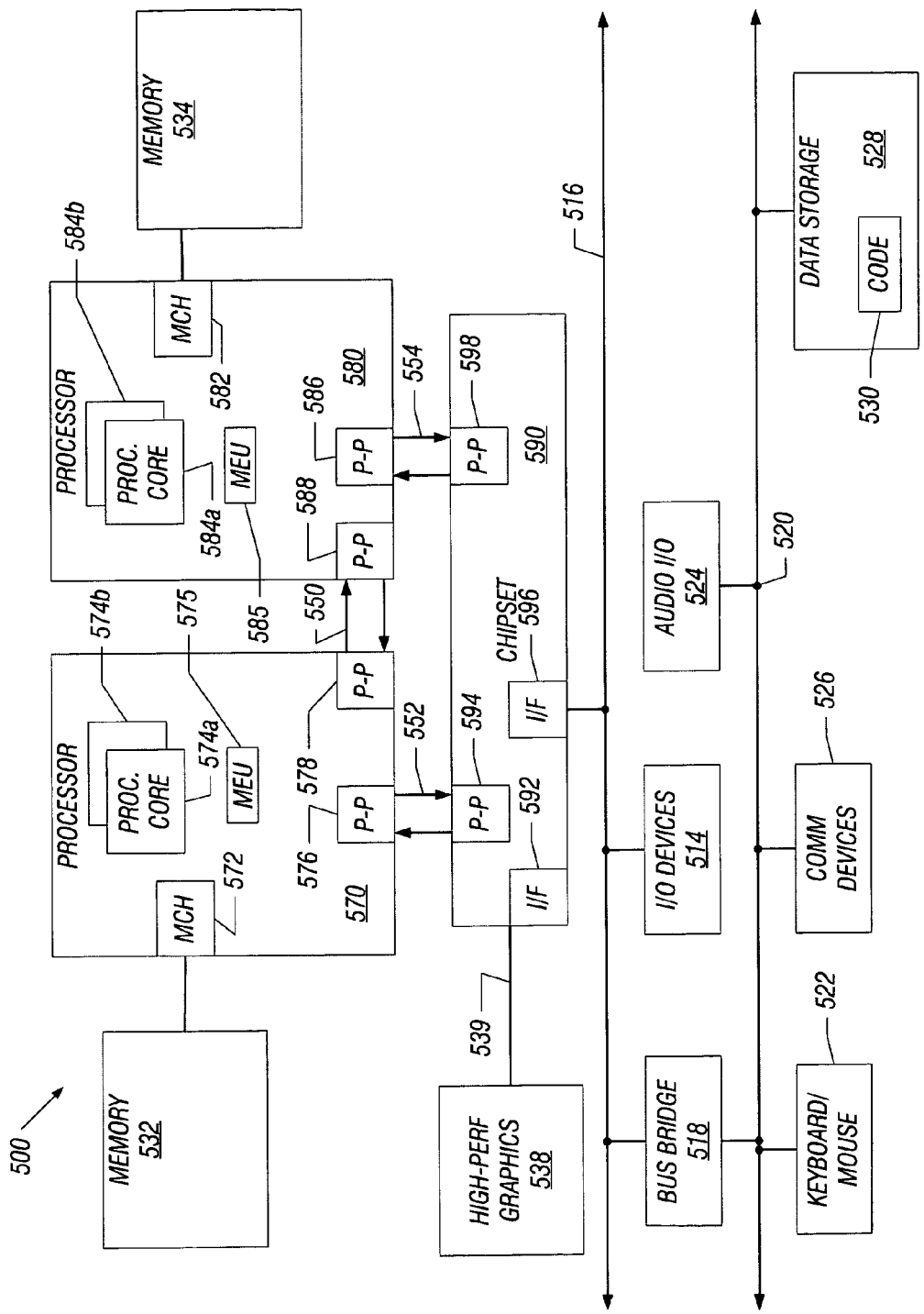
FIG. 4 is a block diagram of a multiprocessor system in accordance with an embodiment of the present invention.

Embodiments may be implemented in many different system types. Referring now to FIG. 4, shown is a block diagram of a multiprocessor system in accordance with an embodiment of the present invention. As shown in FIG. 4, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 4, each of processors 570 and 580 may be multi-core processors including first and second processor cores (i.e., processor cores 574a and 574b and processor cores 584a and 584b), although other cores and potentially many more other cores may be present in particular embodiments. As shown in FIG. 4, a memory execution unit 575 and 585 including respective caches and related structures and controllers may be coupled to each pair of processor cores 574a and 574b and 584a and 584b, respectively. In various embodiments, a controller or other control logic within MEUs 575 and 585 may perform multi-level detection and breaking of locks within the MEUs.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory locally attached to the respective processors.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as the PCI Express bus or another third generation input/output (I/O) interconnect bus, although the scope of the present invention is not so limited.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a first counter to count dispatches of a senior request in a memory unit, the senior request corresponding to an oldest memory operation that has not completed;
   a second counter to count cycles of a processor coupled to the memory unit, the first and second counters initialized when the senior request is received in the memory unit, wherein the second counter is reset when the first counter is incremented until the first counter exceeds a first threshold and thereafter the second counter is not reset, and the first counter is disabled when the second counter exceeds a third threshold such that the first and second counters do not fire simultaneously; and
   a controller coupled to the first counter and the second counter to execute at least one remediation measure with respect to the senior request based on a value of at least the first counter or the second counter.

2. The apparatus of claim 1, wherein the controller is to execute a first remediation measure if a value of the first counter exceeds the first threshold, wherein the first remediation measure comprises placement of a stall on other memory requests in a buffer of the memory unit for a first time period.

3. The apparatus of claim 2, wherein the controller is to execute a second remediation measure if the first remediation measure is unsuccessful and the value of the first counter exceeds a second threshold, wherein the second remediation measure comprises placement of a stall on other memory requests in the buffer of the memory unit for a second time period greater than the first time period.

4. The apparatus of claim 3, wherein the controller is to execute a third remediation measure if the second remediation measure is unsuccessful and a value of the second counter exceeds the third threshold, wherein the third remediation measure comprises removal of one or more pending memory requests from a first structure of the memory unit.

5. The apparatus of claim 1, wherein the memory unit includes the first counter, the second counter, and the controller, wherein the controller is to output a failure signal if the senior request does not complete before the second counter reaches a final threshold level.

6. The apparatus of claim 5, further comprising a processor core coupled to the memory unit to receive the failure signal, wherein the processor is to perform a lock breaking action after receipt of the failure signal.

7. A system comprising:
   a lock breaker to execute a first operation if an oldest memory request has been dispatched at least a first threshold number of times, and to execute a second operation if the oldest memory request has been pending for at least a first threshold time period, the lock breaker including:
      a first counter to count dispatches of the oldest memory request;
      a second counter to count cycles of a processor coupled to the lock breaker, the first and second counters initialized simultaneously when the oldest memory request is received in a memory unit of the processor, wherein the second counter is reset when the first counter is incremented until the first counter exceeds a first threshold and thereafter the second counter is not reset, the first counter disabled when the second counter exceeds a third threshold such that the first and second counters do not fire simultaneously; and
      a controller coupled to the first counter and the second counter to execute the first operation and the second operation, and wherein the first and second operations are controlled to not be executed simultaneously; and
   a dynamic random memory (DRAM) coupled to the lock breaker.

8. The system of claim 7, wherein the lock breaker is to execute a third operation if the oldest memory request has been dispatched at least a second threshold number of times, wherein the third operation is the same operation as the first operation, and wherein the third operation is to be performed for a longer time than the first operation.

9. The system of claim 7, wherein the lock breaker is to signal a lock event to a core if the oldest memory request has not completed before a second threshold time period.

10. The system of claim 7, further comprising the processor coupled to the DRAM, the processor including at least one core and at least one memory unit, wherein the at least one memory unit includes the lock breaker.

11. An article comprising a machine-readable storage medium including instructions that if executed by a machine enable the machine to perform a method comprising:
   determining if a senior memory request corresponding to an oldest memory operation that has not completed, has been dispatched in a memory subsystem at least a first threshold number of times;
   if so, performing a second lock breaking action, wherein the second lock breaking action is less aggressive than a first lock breaking action;

obtaining status information associated with the senior memory request if the senior memory request has been pending for a first threshold time, the status information including an identification of where the senior memory request is pending within the memory subsystem, associated memory operations including at least one additional memory request spawned by the senior memory request, and a type of the senior memory request; and determining whether to perform the first lock breaking action based on the status information and, based on the determination, performing the first lock breaking action, and otherwise not performing the first lock breaking action when the status information indicates the senior memory request has spawned the at least one additional memory request.

12. The article of claim 11, wherein the method further comprises sending a signal from the memory subsystem to a core coupled to the memory subsystem if the senior memory request has been pending for a second threshold time, the second threshold time longer than the first threshold time.

* * * * *

UNITED STATES PATENT AND TRADEMARK OFFICE
CERTIFICATE OF CORRECTION

PATENT NO. : 7,590,784 B2
APPLICATION NO. : 11/513636
DATED : September 15, 2009
INVENTOR(S) : Math et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 168 days.

Signed and Sealed this

Twenty-first Day of September, 2010

David J. Kappos
*Director of the United States Patent and Trademark Office*